(12) United States Patent
Hogt et al.

(10) Patent No.: US 8,334,348 B2
(45) Date of Patent: Dec. 18, 2012

(54) PROCESS FOR THE MODIFICATION OF BIODEGRADABLE POLYMERS

(75) Inventors: Andreas Herman Hogt, Enschede (NL); Wilhelm Klaas Frijlink, Zwolle (NL)

(73) Assignee: Akzo Nobel N.V., Arnhem (NL)

( * ) Notice: Subject to any disclaimer, the term of this patent is extended or adjusted under 35 U.S.C. 154(b) by 449 days.

(21) Appl. No.: 12/281,139

(22) PCT Filed: Feb. 22, 2007

(86) PCT No.: PCT/EP2007/051716
§ 371 (c)(1),
(2), (4) Date: Sep. 5, 2008

(87) PCT Pub. No.: WO2007/099056
PCT Pub. Date: Sep. 7, 2007

(65) Prior Publication Data
US 2009/0124723 A1    May 14, 2009

Related U.S. Application Data

(60) Provisional application No. 60/781,326, filed on Mar. 13, 2006.

(30) Foreign Application Priority Data

Mar. 3, 2006  (EP) ..................................... 06110664

(51) Int. Cl.
*C08G 63/08* (2006.01)
*C08G 63/48* (2006.01)
(52) U.S. Cl. ..................................... 525/450; 525/54.45
(58) Field of Classification Search .................. 525/450, 525/54.45
See application file for complete search history.

(56) References Cited

U.S. PATENT DOCUMENTS

| | | | |
|---|---|---|---|
| 5,594,095 A | 1/1997 | Gruber et al. | |
| 5,932,660 A * | 8/1999 | Meijer et al. | 525/256 |
| 6,096,810 A | 8/2000 | Asrar et al. | |
| 6,353,086 B1 * | 3/2002 | Kolstad et al. | 528/354 |
| 6,559,244 B1 | 5/2003 | Sodergard et al. | |
| 2003/0216496 A1 * | 11/2003 | Mohanty et al. | 524/284 |
| 2005/0123744 A1 * | 6/2005 | Mohanty et al. | 428/331 |
| 2005/0192377 A1 | 9/2005 | Scheer et al. | |
| 2005/0192410 A1 | 9/2005 | Scheer et al. | |

FOREIGN PATENT DOCUMENTS

| | | |
|---|---|---|
| EP | 1 186 618 | 3/2002 |
| WO | WO 95/18169 | 7/1995 |
| WO | WO 96/03397 | 2/1996 |
| WO | WO 2004/052877 | 6/2004 |

OTHER PUBLICATIONS

International Search Report, PCT International Application No. PCT/EP2007/051716 dated Apr. 25, 2007.
Search Report, European Patent Application No. EP 06 11 0664, Jul. 4, 2006.
Derwent WPI Week 200125, Derwent Publications Ltd., JP 2001-026658 dated Jan. 30, 2001, Abstract Only.
Derwent WPI Week 199327, Derwent Publications Ltd., JP 05-140246 dated Jun. 8, 1993, Abstract Only.
Zimm et al., "The Dimensions of Chain Molecules Containing Branches and Rings," *The Journal of Chemical Physics*, vol. 17, No. 12, pp. 1301-1314, Dec. 1949.

\* cited by examiner

*Primary Examiner* — Kriellion Sanders
(74) *Attorney, Agent, or Firm* — Timothy D. Meade

(57) ABSTRACT

Process for the modification of a polymer or copolymer having the following general structure for one or more of the repeating units: (1) wherein n is an integer, m is an integer in the range 0 to 6, and R is selected from hydrogen, substituted or unsubstituted $C_1$-$C_{20}$ alkyl, $C_3$-$C_{20}$ cycloalkyl, $C_6$-$C_{20}$ aryl, $C_7$-$C_{20}$ aralkyl, and $C_7$-$C_{20}$ alkaryl, which groups may include linear or branched alkyl moieties; the optional one or more substituents being selected from the group consisting of hydroxy, alkoxy, linear or branched alk(en)yl, aryloxy, halogen, carboxylic acid, ester, carboxy, nitrile, and amido groups, which process involves contacting the polymer or copolymer with a cyclic organic peroxide under conditions whereby at least some of said peroxide is decomposed. This process results in a (co)polymer with a high degree of branching but free of gel formation.

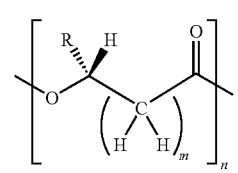

(1)

21 Claims, 3 Drawing Sheets

PROCESS FOR THE MODIFICATION OF BIODEGRADABLE POLYMERS

REFERENCE TO RELATED APPLICATION(s)

This application is the U.S. National Phase of PCT/EP2007/051716 filed on Feb. 22, 2007 and claims the benefit of U.S. Provisional Application No. 60/781,326 filed on Mar. 13, 2006.

The present invention relates to a process for the modification of a polymer or copolymer having the following general structure for one or more of the repeating units:

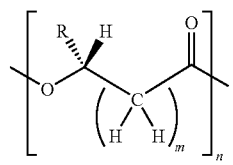

wherein n is an integer, m is an integer in the range 0 to 6, and R is selected from hydrogen, substituted or unsubstituted $C_1$-$C_{20}$ alkyl, $C_3$-$C_{20}$ cycloalkyl, $C_6$-$C_{20}$ aryl, $C_7$-$C_{20}$ aralkyl, and $C_7$-$C_{20}$ alkaryl, which groups may include linear or branched alkyl moieties; the optional one or more substituents being selected from the group consisting of hydroxy, alkoxy, linear or branched alk(en)yl, aryloxy, halogen, carboxylic acid, ester, carboxy, nitrile and amido groups.

These polymers are generally biodegradable, meaning that they can degrade by the action of naturally occurring microorganisms such as bacteria, fungi, and algae.

The commercial potential of these (co)polymers is very high, especially due to their biodegradability and/or natural renewability compared to petrochemically-derived polymers. However, processing of these (co)polymers into commercially attractive products has been hindered by difficulties, such as their poor melt strength during melt processing. Several prior art documents disclose processes for the modification of such (co)polymers in order to solve these difficulties.

U.S. Pat. No. 6,096,810 discloses the modification of polyhydroxyalkanoates which may have the general structure shown above using free radical initiators, such as organic peroxides. The peroxides disclosed in this document are all linear in nature and include 2,5-dimethyl-2,5-di(tert-butylperoxy)hexane and butyl-4,4-di(tert-butylperoxy)valerate.

WO 95/18169 discloses the modification of poly(hydroxy acids) such as polylactic acid by reactive extrusion of the polymer with an organic peroxide. Organic peroxides disclosed in this document are dilauroyl peroxide, tert-butylperoxy-diethylacetate, tert-butylperoxy-2-ethylhexanoate, tert-butyl-peroxyisobutyrate, tert-butylperoxyacetate, tert-butylperoxybenzoate, and dibenzoyl peroxide, which are all of linear nature.

Also U.S. Pat. No. 5,594,095 discloses the modification of polylactic acid with linear organic peroxides such as 2,5-dimethyl-2,5-di(tert-butylperoxy)hexane and dicumyl peroxide.

The polymers modified according to these prior art processes either result in only a minor degree of branching or suffer from gel formation, due to cross-linking. Gel formation results in the occurrence of "fish eyes" in transparent films or coatings or in particulates in mouldings, which is evidently undesired.

Surprisingly, it has now been found that if a cyclic organic peroxide is used to modify the (co)polymer, (co)polymers can be prepared which combine a high degree of branching with the absence of gel formation.

The present invention therefore relates to a process for the modification of a (co)polymer according to the above general structure for one or more of its repeating units, which involves contacting the (co)polymer with a cyclic organic peroxide under conditions whereby at least some of said peroxide is decomposed.

In addition, high molecular weight distributions of the (co)polymer can be obtained, thereby improving its melt strength.

A further advantage of the process of the present invention is that, unlike the peroxides used in the prior art, the cyclic organic peroxides used in the process of the present invention do not release t-butanol as decomposition product. This absence of t-butanol—which, due to its toxicological properties, is undesired in (co)polymers for food-related applications—allows the modified (co)polymers according to the invention to be used in applications involving food contact.

The (co)polymers to be modified using the process according to the invention have the following general structure for one or more of the repeating units:

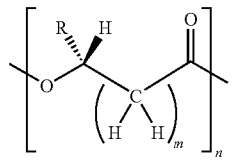

wherein n is an integer, m is an integer in the range 0 to 6, and R is selected from hydrogen, substituted or unsubstituted $C_1$-$C_{20}$ alkyl, $C_3$-$C_{20}$ cycloalkyl, $C_6$-$C_{20}$ aryl, $C_7$-$C_{20}$ aralkyl, and $C_7$-$C_{20}$ alkaryl, which groups may include linear or branched alkyl moieties; the optional one or more substituents being selected from the group consisting of hydroxy, alkoxy, linear or branched alk(en)yl, aryloxy, halogen, carboxylic acid, ester, carboxy, nitrile, and amido groups.

Preferably, all of the repeating units in the (co)polymer satisfy the general structure shown above, although not all of these repeating units need to be the same. For instance, copolymers can be used in which part of the repeating units have a structure wherein m=1 and R=ethyl, while another part of the repeating units have a structure wherein m=1 and R=methyl.

Examples of suitable (co)polymers include polylactic acid (PLA; m=0, R=methyl in the above structure), poly(3-hydroxybutyrate) (m=1, R=methyl), polyglycolic acid (m=0, R=H), polyhydroxy-butyrate-covalerate (m=1, R=ethyl), and poly(ε-caprolactone) (m=4, R=H).

The (co)polymer according to the above structure can be modified in the process of the invention individually or while present in a blend with one or more other (co)polymers or materials. Suitable other (co)polymers are polyacrylates and polymethacrytales, copolymers like Ecoflex® (a copolymer of 1,4-butanediol and terephthalic acid/adipinic acid), starch or starch-derived polymers, cellulose or cellulose-derived polymers, and other natural (co)polymers.

Cyclic organic peroxides are defined as organic molecules having a cyclic moiety and wherein the cyclic moiety contains a peroxide group. Cyclic organic peroxides that are suitable for use in the process of the present invention include cyclic ketone peroxides and 1,2,4-trioxepanes. Also mixtures of one or more cyclic organic peroxides or mixtures of one or more cyclic organic peroxides with one or more non-cyclic organic peroxides may be used.

As shown in the Examples below, the use of 1,2,4-trioxepanes even increases the melt flow index of the resulting (co)polymer. This means that the melt processing properties of the resulting (co)polymer are improved, which is of importance if the polymer is to be processed by extrusion coating, fibre spinning, or injection moulding.

Preferred cyclic ketone peroxides are selected from the peroxides presented by formulae I-III:

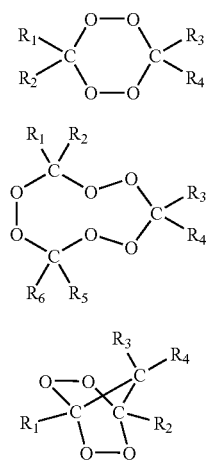

wherein $R_1$-$R_6$ are independently selected from the group consisting of hydrogen, $C_1$-$C_{20}$ alkyl, $C_3$-$C_{20}$ cycloalkyl, $C_6$-$C_{20}$ aryl, $C_7$-$C_{20}$ aralkyl, and $C_7$-$C_{20}$ alkaryl, which groups may include linear or branched alkyl moieties; and each of $R_1$-$R_6$ may optionally be substituted with one or more groups selected from hydroxy, alkoxy, linear or branched alkyl, aryloxy, ester, carboxy, nitrile, and amido.

Preferably, the cyclic ketone peroxides consist of oxygen, carbon, and hydrogen atoms. More preferably, the cyclic ketone peroxide is derived from linear, branched or cyclic $C_3$-$C_{13}$ ketones, most preferably $C_3$-$C_7$ ketones or $C_4$-$C_{20}$ diketones, most preferably $C_4$-$C_7$ diketones. The use of ketones leads to the formation of the cyclic ketone peroxides of formulae I and II, while the use of diketones leads to the formation of the cyclic ketone peroxides of formula III. Examples of suitable cyclic ketone peroxides for use in the process of the present invention include the peroxides derived from acetone, acetyl acetone, methyl ethyl ketone, methyl propyl ketone, methyl isopropyl ketone, methyl butyl ketone, methyl isobutyl ketone, methyl amyl ketone, methyl isoamyl ketone, methyl hexyl ketone, methyl heptyl ketone, diethyl ketone, ethyl propyl ketone, ethyl amyl ketone, methyl octyl ketone, methyl nonyl ketone, cyclopentanone, cyclohexanone, 2-methylcyclohexanone, 3,3,5-trimethyl cyclohexanone, and mixtures thereof.

Cyclic ketone peroxides can be produced as described in WO 96/03397.

1,2,4-Trioxepanes are peroxides with the following formula:

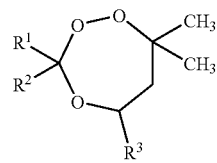

wherein $R^1$, $R^2$, $R^3$ are independently selected from hydrogen and a substituted or unsubstituted hydrocarbyl group and wherein optionally two of the group of $R^1$, $R^2$, and $R^3$ are linked to form a ring structure.

Preferred 1,2,4-trioxepanes are those wherein $R^{1-3}$ are independently selected from the group consisting of hydrogen and substituted or unsubstituted $C_1$-$C_{20}$ alkyl, $C_3$-$C_{20}$ cycloalkyl, $C_6$-$C_{20}$ aryl, $C_7$-$C_{20}$ aralkyl, and $C_7$-$C_{20}$ alkaryl, which groups may include linear or branched alkyl moieties, while two of the groups $R^{1-3}$ may be connected to form a (substituted) cycloalkyl ring; the optional one or more substituents on each of $R^1$-$R^3$ being selected from the group consisting of hydroxy, alkoxy, linear or branched alk(en)yl, aryloxy, halogen, carboxylic acid, ester, carboxy, nitrile, and amido.

Preferably, $R^1$ and $R^3$ are selected from lower alkyl groups, more preferably $C_1$-$C_6$ alkyl groups, such as methyl, ethyl, and isopropyl, methyl and ethyl being most preferred. $R^2$ is preferably selected from hydrogen, methyl, ethyl, iso-propyl, iso-butyl, tert-butyl, amyl, iso-amyl, cyclohexyl, phenyl, $CH_3C(O)CH_2-$, $C_2H_5OC(O)CH_2-$, $HOC(CH_3)_2CH_2-$, and

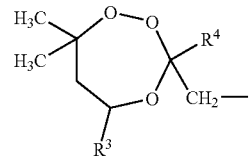

wherein $R^4$ is independently selected from any of the group of compounds given for $R^{1-3}$. Another preferred 1,2,4-trioxepane is:

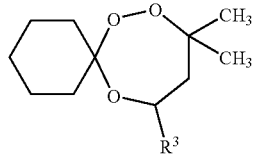

The (co)polymer and the cyclic organic peroxide may be brought into contact in various ways, depending on the particular object of the modification process. The peroxide may be mixed with a melt, a solid (as powder, flake, pellet, film, or sheet), or a solution of the (co)polymer.

To accomplish homogeneous mixing of the (co)polymer and the peroxide, a conventional mixing apparatus may be used, such as a kneader, an internal mixer, or an extruder. Should mixing be a problem for a particular material because of its high melting point, for example, the (co)polymer can first be modified on its surface while in the solid state and subsequently melted and mixed. Alternatively, the (co)polymer may first be dissolved in a solvent and the reaction with the peroxide can then be carried out in solution.

The moment at which the peroxide and the (co)polymer are brought into contact with each other and the moment at which the peroxide is to react with the (co)polymer can be chosen independently of the other usual processing steps, including the introduction of additives, shaping, etc. For instance, the (co)polymer may be modified before additives are introduced into the (co)polymer or after the introduction of additives. More importantly, it is possible to accomplish the present (co)polymer modification during a (co)polymer shaping step such as extrusion, extrusion coating, compression moulding, thermoforming, foaming, film blowing, blow moulding, injection moulding, or injection stretch blow molding. The present polymer modification process is most preferably carried out in an extrusion apparatus The amount of peroxide used in the process of the present invention should be such as to be effective to achieve significant modification of the (co)polymer. Preferably at least 0.005 wt %, more preferably at least 0.01 wt %, and most preferably at least 0.05 wt % of cyclic organic peroxide is used, based on the weight of (co)polymer. The amount of cyclic organic peroxide, based on the weight of (co)polymer, preferably is below 10 wt %, more preferably below 5 wt %, and most preferably below 1 wt %.

Suitable conditions under which at least some of the peroxide is decomposed are temperatures of preferably at least 180° C., more preferably at least 190° C., more preferably still at least 200° C., even more preferably at least 215° C., and most preferably at least 220° C. The temperature applied during the process of the invention preferably is not higher than 260° C., more preferably not higher than 250° C., more preferably still not higher than 240° C., even more preferably not higher than 230° C., and most preferably not higher than 225° C.

After modification, the (co)polymer is cooled and/or devolatized using standard techniques in the polymerization industry.

The processing time, i.e. the time period ranging from the moment of contacting the peroxide and the (co)polymer to the moment of cooling or devolatizing the modified (co)polymer preferably is at least 5 seconds, more preferably at least 10 seconds, and most preferably at least 15 seconds. The processing time preferably is not more than 15 minutes, more preferably not more than 10 minutes, more preferably still not more than 5 minutes, even more preferably not more than 60 seconds, and most preferably not more than 45 seconds.

Both the desired processing time and the desired temperature depend on the manner in which the peroxide and the (co)polymer are contacted with each other. According to one embodiment of the invention, the cyclic organic peroxide is injected into a melt of the (co)polymer, for instance in an extruder. Using this procedure, the processing time preferably ranges from 5-60 seconds, more preferably 5-45 seconds. The temperature of the (co)polymer melt at the moment of injection preferably is in the range of 200-240° C., more preferably 215-230° C., and most preferably 220-225° C.

According to another embodiment, the (co)polymer and the cyclic organic peroxide are pre-mixed and then introduced into the mixing apparatus—e.g. a kneader, an internal mixer, or, preferably, an extruder. This embodiment may require processing times of up to 15 minutes or more, preferably up to 10 minutes, more preferably up to 5 minutes. The desired temperature of the mixture while present in the mixing apparatus will depend on its residence time therein. The longer the residence time, the lower the temperature may be.

During modification, the (co)polymer may also contain additives. Preferred additives are catalyst quenchers and slip and antiblocking agents such as fatty amides. If desired, also stabilizers such as inhibitors of oxidative, thermal, or ultraviolet degradation, lubricants, extender oils, pH controlling substances such as calcium carbonate, release agents, colorants, reinforcing or non-reinforcing fillers such as silica, clay, chalk, carbon black, and fibrous materials such as glass fibres, natural fibres, wood-derived materials, nucleating agents, plasticizers, and accelerators, may be present.

The modified (co)polymer according to the present invention can be used in various applications, such as extruded or blown films, coatings for packaging, in particular for coating paper or board, foamed or moulded articles such as bottles, beakers, or trays, for instance foamed trays for microwavable or ovenable food products, clam shells or other thermoformed articles, or injection-moulded trays.

FIGURES

EXAMPLES

Methods

Melt Flow Index

Figure 1:
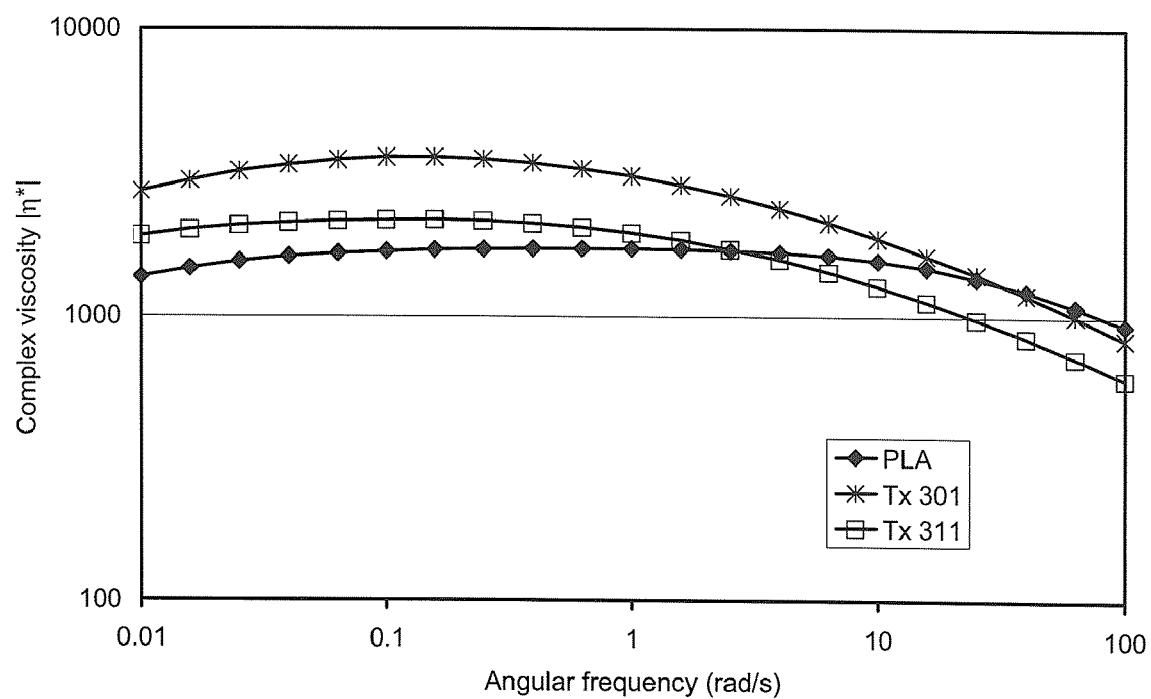
FIG. 1 shows the viscosity as a function of the angular frequency for an unmodified polylactic acid (PLA) and for polylactic acid modified according to the present invention using Trigonox® 301 (Tx 301) and Trigonox® 311 (Tx 311).

The melt-flow index (MFI) was measured with a Göttfert® Melt indexer Model MP-D according to DIN 53735/ASTM 1238 (190° C., 21.6 N load). The MFI is expressed in g/10 min.

Molecular Weight Characterization and Branching

The molecular weight of the modified (co)polymer was determined using a size-exclusion chromatography (SEC)-system consisting of a

| Pump | | Knauer HPLC-pump K501 |
|---|---|---|
| Eluent | | 1,1,1,3,3,3-Hexafluoroisopropanol (HFIP) |
| Flow | | 0.6 ml/min |
| Injection | | Spark Holland Triathlon autosamples, 50 µl |
| Concentration | | about 2 mg/ml |
| Solvent | | 1,1,1,3,3,3-Hexafluoroisopropanol |
| Column | | 2x PSS PFG linear XL 7µ, 300 × 8 mm |
| Detection | RI | Waters 410 Differential Refractometer |
| | DP | Viscotek Viscometer detector H502 |
| | LS | Viscotek RALLS detector |

The molecular weights of the samples, i.e. the number-average (Mn), weight-average (Mw), and z-average (Mz) molecular weights, were calculated from Light Scattering (LS) detection. The dispersity (D) was calculated as Mw/Mn.

The Intrinsic Viscosity (IV) was determined in the viscometer detector.

From the Mark-Houwink plots, the branching number (Bn, i.e. the average number of branches per molecule) and the frequency ($\lambda$, i.e. the branching per 100 monomeric units) were calculated according to the theory of Zimm and Stockmayer, *J. Chem. Phys.* 17 (1949) 1301. The structure factor $\epsilon$ for randomly branched polymers was taken as 0.75.

Measurement of the Gel Fraction

Prior to the analysis, the samples were dried overnight in a circulation oven at 50° C.

Procedure: 1 gram of sample and 50 ml of dichloromethane were added to a 50 ml crimp cap vial and the vial was capped. The vial was shaken for at least 10 hours at room temperature.

A filter paper (Schleicher & Schuell No. 597, 45 mm) was washed with 5 ml of dichoromethane (DCM) using a Büchner funnel, a filtering conical flask, and a water aspirator to provide suction for speeding up the filtration process.

The cleaned filter paper was placed on a petri dish, dried for 1 hour at 130° C., and cooled to room temperature in a desiccator. The petri dish, including the dried filter paper, was weighed.

Next, a vacuum was applied to the Büchner funnel and the sample solution was poured into the funnel. The filter paper including the residue was placed in the petri dish again, dried for 2 hours at 130° C., and cooled to room temperature in a desiccator. The petri dish including the dried filter paper and the residue was weighed again and the weight of the residue was calculated.

The gel content is defined as the weight of the residue, relative to the initial weight of the sample (1 gram). A gel fraction of less than 0.2 wt % indicates the absence of gel formation.

Low-Shear Viscosity Measurement

Rheology measurements at low shear were performed at 180° C. using a AR2000 Shear Dynamic Rheometer (TA Instruments) with the following specifications:

| | |
|---|---|
| Torque range CS: | 0.1 µN · m to 200 mN · m |
| Speed range CS: | 1E−8 to 300 rad/s |
| Inertia: | ~15 µN · m$^2$ |
| Frequency range: | 1.2E−7 to 100 Hz |
| Step change in speed: | <30 ms |
| Step change in strain: | <60 ms |
| Step change in stress: | <1 ms |

Measurement of Volatiles

Volatiles in the modified polymer samples were determined by GC static head space analysis using a Hewlett Packard HP5890 series 2 GC, a Combi-Pal (CTC Analytics, Switzerland) auto-injector capable of standard liquid injection and static headspace injection, and LabSystems' Atlas 2000 as the data system.

The following conditions were used:

| | |
|---|---|
| Column | Fused silica, 25 m × 0.32 mm ID, coated with CP-Sil 5 CB, film thickness 5 µm, ex Chrompack |
| Carrier gas | Helium, methane retention time: 62 sec at 40° C. |
| Injector temperature | Split 150° C. |
| split flow | 20 ml/min |
| Detector temperature | Flame Ionization Detector 320° C. |
| detector sensitivity | Range = 2 |
| Oven temperature | Initial: 40° C. for 3 min. Rate 1: 5° C./min to 80° C. Rate 2: 12° C./min Final: 300° C. for 1 min. |
| Injection volume | |
| Headspace (gas) | 1.0 ml |

1 gram of polymer sample was heated for 1 hour at 140° C. in a 20 ml crimp cap vial. 1 ml of the headspace from the vial was then injected onto the GC column.

Example 1

Polylactic acid (PLA) granules (HM1010, ex Hycail; MFI=5.9 g/10 min) were added to a W&P ZSK30 extruder (L/D=36) using a Retsch vibrating gutter placed on a KTRON 1 balance for measuring throughput. The screw speed of the extruder was 200 rpm; the screw length 1,150 mm.

The following temperature profile was used in the extruder: 200-240-240-240-240-240° C.

Pure peroxide was injected to the polylactic acid melt at a screw length of 439 mm. Vacuum degassing was started at a screw length of 895 mm. Injection of peroxide was performed using a Knauer (Separations) 10 ml dosing pump with pressure readout and high-pressure restriction. The dosing head was cooled with water.

Three cyclic organic peroxides were used:
Trigonox® 301 (3,6,9-triethyl-3,6,9-trimethyl-1,4,7-triperoxononane, ex Akzo Nobel)
Trigonox® 311 (3,3,5,7,7-pentamethyl-1,2,4-trioxepane, ex Akzo Nobel), and MEK-TP (3-ethyl-3,5,7,7-tetramethyl-1,2,4-trioxepane).

Four non-cyclic organic peroxides were used:
Trigonox® 101 (2,5-dimethyl-2,5-di(tert-butylperoxy)hexane, ex Akzo Nobel)
Trigonox® 117 (Tert-butylperoxy 2-ethylhexyl carbonate, ex Akzo Nobel)
Trigonox® 17 (Butyl-4,4-di(tert-butylperoxy)valerate, ex Akzo Nobel)
Trigonox® C (Tert-butylperoxybenzoate, ex Akzo Nobel)

The peroxides were used in two quantities: 0.25 wt % and 0.50 wt %, based on polylactic acid.

The MFI, the molecular weight distribution, the branching number and frequency, and the gel fraction of the resulting modified polylactic acid were determined according to the procedures explained above. The results are presented in Tables 1 and 2 (wherein "Tx" stands for Trigonox®).

TABLE 1

| Peroxide | MFI | Mn | Mw | Mz | D | Bn (avg) | Lambda (avg) |
|---|---|---|---|---|---|---|---|
| None | 5.9 | 57,000 | 111,000 | 173,000 | 1.95 | 0.14 | 0.004 |
| 0.25% Tx101 | 7.4 | 52,800 | 117,000 | 211,000 | 2.22 | 0.28 | 0.008 |
| 0.5% Tx101 | 7.6 | 56,100 | 111,000 | 177,150 | 1.98 | 0.14 | 0.004 |
| 0.25% Tx117 | 6.9 | 53,800 | 111,000 | 178,000 | 2.06 | 0.14 | 0.004 |
| 0.5% Tx117 | 6.9 | 51,100 | 109,000 | 175,000 | 2.13 | 0.13 | 0.004 |
| 0.25% Tx17 | 6.2 | 51,400 | 110,000 | 177,000 | 2.14 | 0.14 | 0.004 |
| 0.5% Tx17 | 6.1 | 51,700 | 114,000 | 181,000 | 2.21 | 0.15 | 0.005 |
| 0.25% TxC | 6.8 | 57,000 | 112,000 | 173,000 | 1.96 | 0.14 | 0.007 |
| 0.5% TxC | 7.0 | 51,600 | 110,000 | 173,000 | 2.13 | 0.13 | 0.004 |
| 0.25% Tx301 | 7.5 | 44,100 | 122,000 | 228,000 | 2.77 | 0.39 | 0.014 |
| 0.5% Tx301 | 7.1 | 48,400 | 127,000 | 257,000 | 2.62 | 0.46 | 0.015 |
| 0.25% Tx311 | 16.0 | 39,900 | 96,000 | 181,000 | 2.41 | 0.57 | 0.023 |
| 0.5% Tx311 | 26.2 | 36,500 | 91,000 | 181,000 | 2.49 | 1.09 | 0.058 |

TABLE 2

| Peroxide | Gel fraction |
|---|---|
| None | 0.08 |
| 0.25% Tx101 | 0.75 |
| 0.50% Tx101 | 0.48 |
| 0.25% TxC | 0.06 |
| 0.50% TxC | 0.12-0.16 |
| 0.25% Tx17 | 0.06 |
| 0.50% Tx17 | 0.06 |
| 0.25% Tx117 | 0.08 |
| 0.50% Tx117 | 0.09 |
| 0.25% Tx301 | 0.07 |
| 0.50% Tx301 | 0.11-0.13 |
| 0.25% Tx311 | 0.06-0.10 |
| 0.50% Tx311 | 0.12 |

These tables show that the use of a cyclic organic peroxide according to the present invention combines the absence of gel formation with broadening of the molecular weight distribution and increased branching. In addition, Trigonox® 311 was able to increase the melt flow of the polymer.

Example 2

Example 1 was repeated, except that the polylactic acid used was commercial grade ex NatureWorks (MFI=8.2 g/10 min), the temperature profile in the extruder was 220/220/220/220/220/220° C., and the peroxides tested were: Trigonox® 301, Trigonox® 311, Trigonox® 101, mixtures of these peroxides (both 0.25 wt %), and MEK-TP.

The results are shown in Tables 3 and 4.

TABLE 3

| Peroxide | MFI | Mn | Mw | Mz | D | IV | Lambda (avg) | Bn (avg) |
|---|---|---|---|---|---|---|---|---|
| None | 8.2 | 57,000 | 102,000 | 156,000 | 1.79 | 1.45 | 0.006 | 0.10 |
| 0.25% Tx101 | 5.4 | 60,000 | 142,000 | 309,000 | 2.37 | 1.64 | 0.04 | 0.82 |
| 0.5% Tx101 | 4.2 | 55,000 | 164,000 | 435,000 | 2.98 | 1.71 | 0.04 | 1.19 |
| 0.25% Tx301 | 8.3 | 55,000 | 115,000 | 206,000 | 2.09 | 1.47 | 0.05 | 0.67 |
| 0.5% Tx301 | 7.8 | 49,000 | 125,000 | 259,000 | 2.55 | 1.49 | 0.06 | 0.95 |
| 0.25% Tx311 | 14.9 | 50,000 | 103,000 | 186,000 | 2.06 | 1.28 | 0.08 | 1.03 |
| 0.5% Tx311 | 14.9 | 40,000 | 113,000 | 262,000 | 2.83 | 1.29 | 0.08 | 1.4 |
| 0.25% MEK-TP | 11.7 | 47,000 | 106,000 | 206,000 | 2.26 | 1.35 | 0.06 | 0.80 |
| 0.5% MEK-TP | 12.9 | 45,000 | 121,000 | 277,000 | 2.69 | 1.35 | 0.08 | 1.46 |
| Tx311 + Tx101 | 12.7 | 35,000 | 123,000 | 325,000 | 3.51 | 1.31 | 0.10 | 1.75 |
| Tx311 + Tx301 | 13.6 | 40,000 | 110,000 | 240,000 | 2.75 | 1.30 | 0.07 | 1.20 |

TABLE 4

| Peroxide | Gel fraction |
|---|---|
| 0.25% Tx101 | 1.2 |
| 0.5% Tx101 | 27 |
| 0.25% Tx301 | <0.2 |
| 0.5% Tx301 | <0.2 |
| 0.25% Tx311 | <0.2 |
| 0.5% Tx311 | <0.2 |
| 0.25% MEK-TP | <0.2 |
| 0.5% MEK-TP | <0.2 |
| Tx311 + Tx101 | 2.9 |
| Tx311 + Tx301 | <0.2 |

These tables again show that the use of a cyclic organic peroxide according to the present invention combines the absence of gel formation with broadening of the molecular weight distribution and increased branching.

In addition, the volatiles generated by decomposition of the peroxide and remaining in the polylactic acid even after devolatization in the extruder were detected according to the method described above. The results are shown in Table 5.

TABLE 5

| | Concentration (mg/kg) | | |
|---|---|---|---|
| Peroxide | Acetone | t-Butanol | Total volatiles |
| — | <0.1 | <0.1 | 5 |
| 0.5% Tx 101 | 513 | 30 | 758 |
| 0.5% Tx 301 | 0.6 | <0.1 | 146 |
| 0.5% Tx 311 | 48 | <0.1 | 268 |
| 0.5% MEK-TP | 37 | <0.1 | 232 |

This data shows that by using the cyclic organic peroxides according to the invention the amount of volatiles remaining in the polymer, and in particular the amount of acetone and tert-butanol, is significantly lower than upon use of a linear peroxide.

Further, the low-shear viscosities of the unmodified polymer and the polymer modified with 0.5 wt % Trigonox® 301 and Trigonox® 311 were measured.

The result is plotted in FIG. 1, which shows that the process according to the invention leads to polymer with an increased low-shear viscosity, indicating increased chain entanglement by long-chain branching.

Example 3

Example 2 was repeated, except that the temperature profile in the extruder was 210/210/210/210/210/210° C.

The results are shown in Tables 6 and 7.

TABLE 6

| Peroxide | MFI | Mn | Mw | Mz | D | IV | Lambda (avg) | Bn (avg) |
|---|---|---|---|---|---|---|---|---|
| none | 8.1 | 56,000 | 102,000 | 156,000 | 1.82 | 1.46 | 0.006 | 0.10 |
| 0.5% Tx101 | 4.0 | 55,000 | 172,000 | 452,000 | 3.13 | 1.71 | 0.09 | 1.75 |
| 0.5% MEK-TP | 14.0 | 41,000 | 115,000 | 267,000 | 2.80 | 1.31 | 0.08 | 1.44 |
| 0.5% Tx301 | 8.1 | 47,000 | 123,000 | 266,000 | 2.62 | 1.47 | 0.05 | 0.96 |
| 0.5% Tx311 | 14.0 | 43,000 | 106,000 | 219,000 | 2.47 | 1.27 | 0.10 | 1.31 |

TABLE 7

| Peroxide | Gel fraction |
|---|---|
| 0.5% Tx101 | 34 |
| 0.5% MEK-TP | <0.2 |
| 0.5% Tx301 | <0.2 |
| 0.5% Tx311 | <0.2 |

These Tables confirm that the use of a cyclic organic peroxide according to the present invention combines the absence of gel formation with broadening of the molecular weight distribution and increased branching.

Example 4

Example 2 was repeated, except that a different polylactic acid grade ex NatureWorks (MFI=13.8 g/10 min) was used. The peroxide tested was Trigonox® 301, at higher concentrations (up to 1.0 wt %).

The results are shown in Table 8.

TABLE 8

| Peroxide | MFI | Mn | Mw | Mz | D | IV | Lambda (avg) | Bn (avg) |
|---|---|---|---|---|---|---|---|---|
| none | 13.8 | 49,000 | 85,000 | 130,000 | 1.73 | 1.19 | 0.002 | 0.02 |
| 0.25% Tx301 | 16.2 | 43,000 | 85,000 | 146,000 | 1.98 | 1.11 | 0.01 | 0.19 |
| 0.5% Tx301 | 15.6 | 45,000 | 96,000 | 204,000 | 2.13 | 1.14 | 0.03 | 0.47 |
| 0.75% Tx301 | 13.7 | 43,000 | 101,000 | 243,000 | 2.35 | 1.12 | 0.03 | 0.58 |
| 1.0% Tx3011 | 17.2 | 45,000 | 114,000 | 321,000 | 2.53 | 1.16 | 0.03 | 0.75 |

The gel fraction was measured for all samples, indicating the absence of gel formation.

The results from Table 8 indicate the introduction of long-chain branches, leading to an increase in Mw and an enhanced Mz, which provides increased melt elasticity to the polymer.

Figure 2:
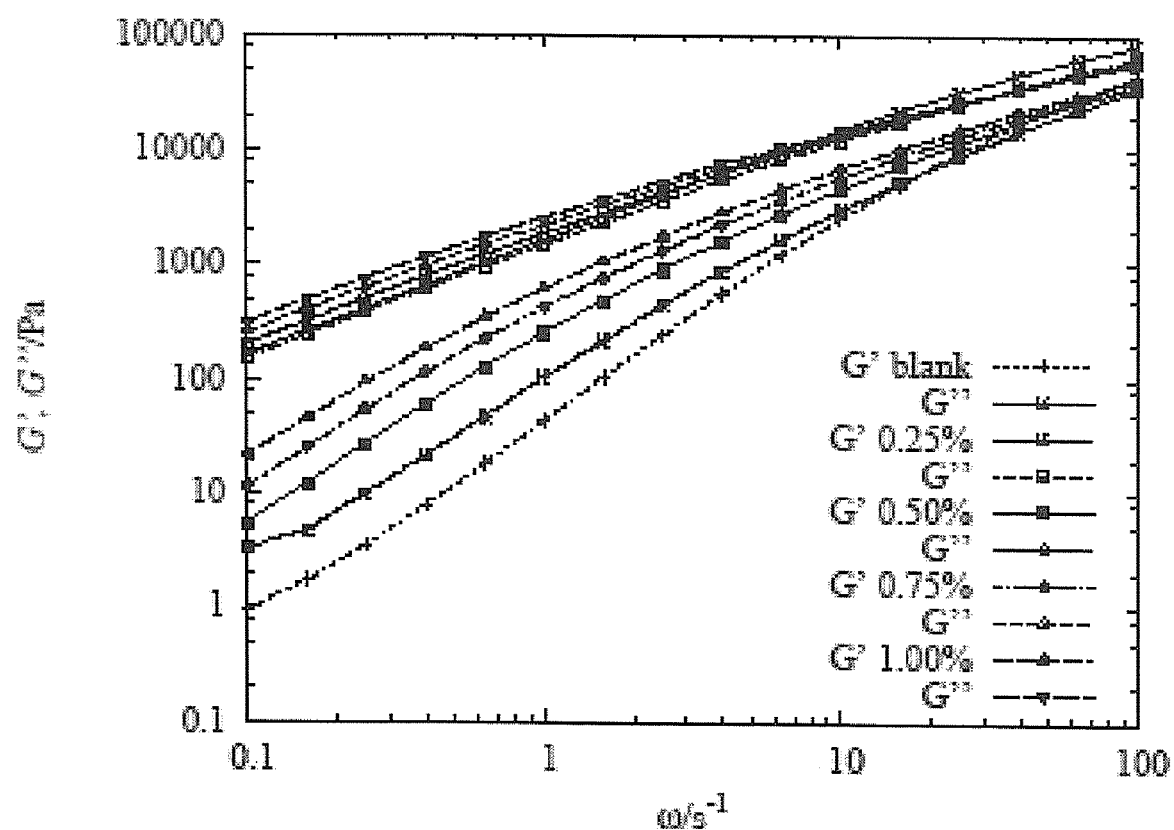
FIG. 2 shows measurement of the storage modulus (G') and the loss modulus (G") in an oscillatory frequency sweep of the unmodified polymer and the modified polymers of Example 4.

The increase in melt elasticity of the modified polymers was confirmed by measurement of the storage modulus (G') and the loss modulus (G") in an oscillatory frequency sweep. The result is plotted in FIG. 2.

The storage modulus (G') increases at higher wt % Trigonox® 301, indicating enhancement of the melt elasticity.

Figure 3:
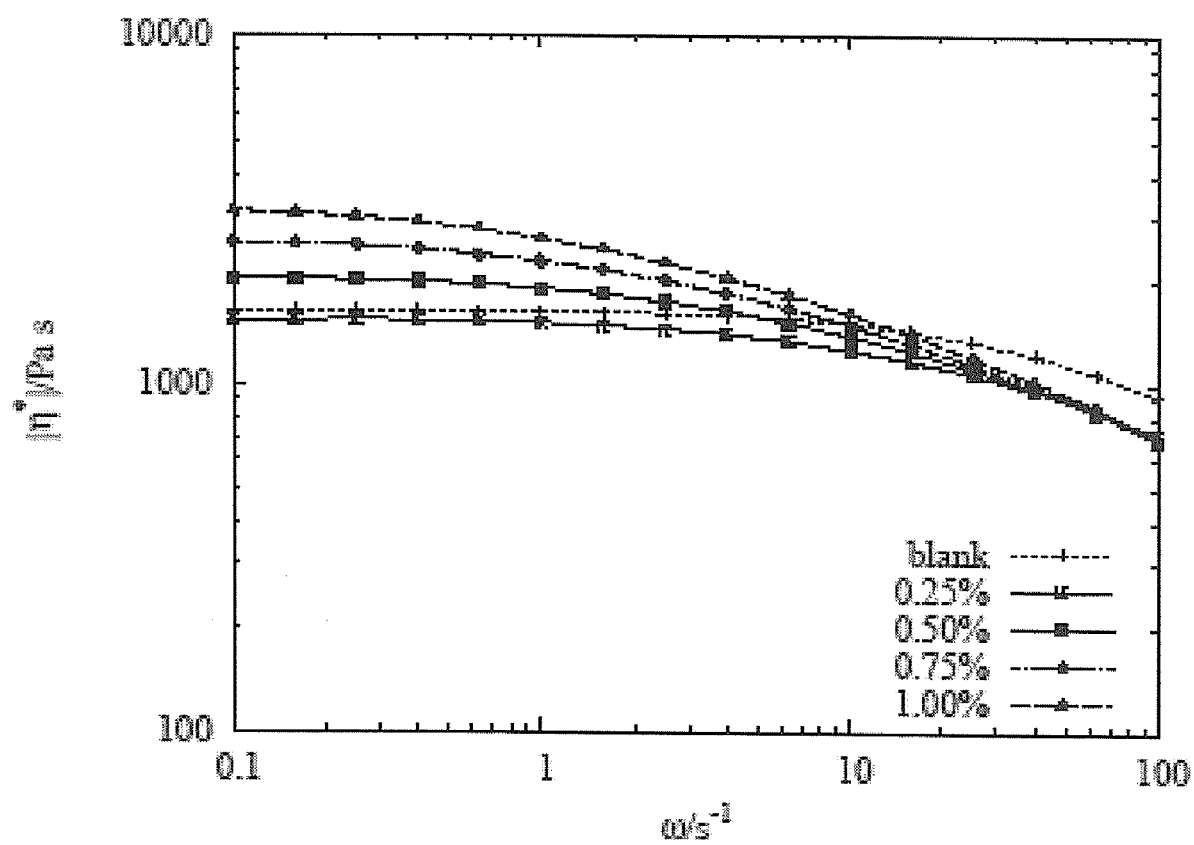
FIG. 3 shows the low-shear viscosities of the unmodified polymer and the modified polymers of Example 4.

Further, the low-shear viscosities of the unmodified polymer and the modified polymers were measured. The result is plotted in FIG. 3, which shows that the process according to the invention leads to polymer with an increased zero-shear viscosity (as a result of higher Mw) and "shear thinning" behavior (as a result of higher Mz/Mw, also referred to as polydispersity), next to the enhanced melt elasticity. These properties are enhanced further with increasing wt % of Trigonox® 301.

The invention claimed is:

1. A process for the modification of a polymer or copolymer having the following general structure for one or more of the repeating units:

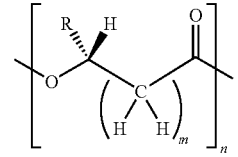

wherein n is an integer, m is an integer in the range 0 to 6, and R is selected from the group consisting of hydrogen, substituted or unsubstituted $C_1$-$C_{20}$ alkyl, $C_3$-$C_{20}$ cycloalkyl, $C_6$-$C_{20}$ aryl, $C_7$-$C_{20}$ aralkyl, and $C_7$-$C_{20}$ alkaryl, which groups may include linear or branched alkyl moieties; the optional one or more substituents being selected from the group consisting of hydroxy, alkoxy, linear or branched alk(en)yl, aryloxy, halogen, carboxylic acid, ester, carboxy, nitrile, and amido groups, the process comprising contacting the polymer or copolymer with a cyclic organic peroxide under conditions whereby at least some of said peroxide is decomposed and wherein the melt strength of the polymer or copolymer is improved.

2. The process according to claim 1 wherein the polymer or copolymer and the cyclic peroxide are contacted at a temperature in the range of 180-260° C.

3. The process according to claim 2 wherein the polymer or copolymer and the cyclic peroxide are contacted at a temperature in the range of 200-240° C.

4. The process according to claim 1 wherein the contacting comprises injecting the cyclic peroxide into a melt of the polymer or copolymer.

5. The process according to claim 1 wherein the cyclic peroxide is selected from the group consisting of cyclic ketone peroxides and 1,2,4-trioxepanes.

6. The process according to claim 1 wherein the polymer is polylactic acid.

7. The process according to claim 1 wherein the (co)polymer is present in a blend with one or more other (co)polymers or materials.

8. A modified polymer or copolymer having the following general structure for one or more of the repeating units:

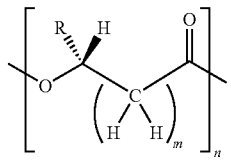

wherein n is an integer, m is an integer in the range 0 to 6, and R is selected from the group consisting of hydrogen, substituted or unsubstituted $C_1$-$C_{20}$ alkyl, $C_3$-$C_{20}$ cycloalkyl, $C_6$-$C_{20}$ aryl, $C_7$-$C_{20}$ aralkyl, and $C_7$-$C_{20}$ alkaryl, which groups may include linear or branched alkyl moieties; the optional one or more substituents being selected from the group consisting of hydroxy, alkoxy, linear or branched alk(en)yl, aryloxy, halogen, carboxylic acid, ester, carboxy, nitrile, and amido groups, wherein the modified polymer or copolymer is obtained by the process of claim 1.

9. A film, coating, or article comprising the modified polymer of claim 8.

10. A composition comprising (i) a polymer or copolymer having the following general structure for one or more of the repeating units:

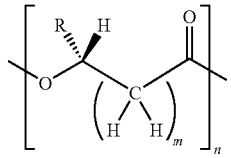

wherein n is an integer, m is an integer in the range 0 to 6, and R is selected from the group consisting of substituted or unsubstituted $C_1$-$C_{20}$ alkyl, $C_3$-$C_{20}$ cycloalkyl, $C_6$-$C_{20}$ aryl, $C_7$-$C_{20}$ aralkyl, and $C_7$-$C_{20}$ alkaryl, which groups may include linear or branched alkyl moieties; the optional one or more substituents being selected from the group consisting of hydroxy, alkoxy, linear or branched alk(en)yl, aryloxy, halogen, carboxylic acid, ester, carboxy, nitrile, and amido groups; and (ii) a cyclic organic peroxide.

11. The process according to claim 3 wherein the contacting comprises injecting the cyclic peroxide into a melt of the polymer or copolymer.

12. The process according to claim 2 wherein the cyclic peroxide is selected from the group consisting of cyclic ketone peroxides and 1,2,4-trioxepanes.

13. The process according to claim 4 wherein the cyclic peroxide is selected from the group consisting of cyclic ketone peroxides and 1,2,4-trioxepanes.

14. The process according to claim 11 wherein the cyclic peroxide is selected from the group consisting of cyclic ketone peroxides and 1,2,4-trioxepanes.

15. The process according to claim 2 wherein the polymer is polylactic acid.

16. The process according to claim 4 wherein the polymer is polylactic acid.

17. The process according to claim 5 wherein the polymer is polylactic acid.

18. The process according to claim 2 wherein the (co)polymer is present in a blend with one or more other (co)polymers or materials.

19. The process according to claim 4 wherein the (co)polymer is present in a blend with one or more other (co)polymers or materials.

20. The process according to claim 5 wherein the (co)polymer is present in a blend with one or more other (co)polymers or materials.

21. The composition according to claim 10 wherein the cyclic peroxide is selected from the group consisting of cyclic ketone peroxides and 1,2,4-trioxepanes.

* * * * *